K. FEILNER.
STARTING DEVICE FOR MULTICYLINDER INTERNAL COMBUSTION ENGINES.
APPLICATION FILED APR. 25, 1913.
1,127,218.
Patented Feb. 2, 1915.
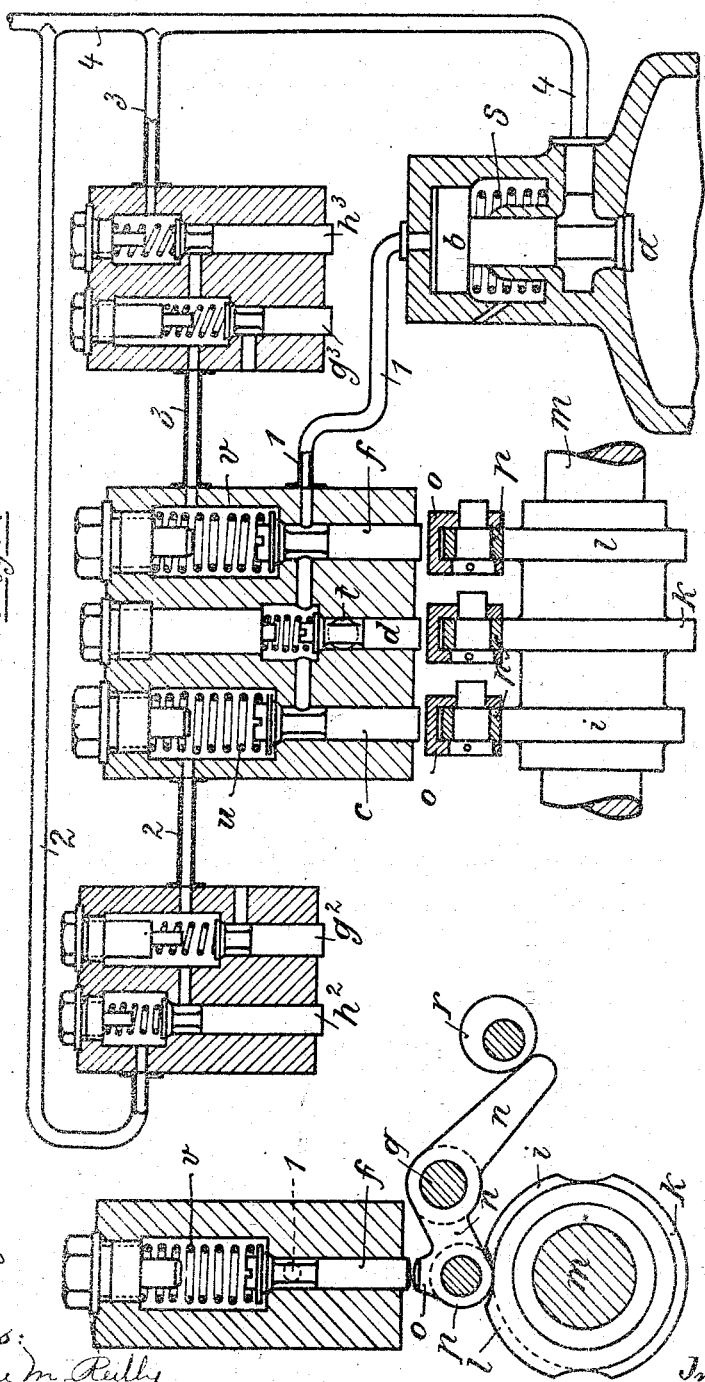

UNITED STATES PATENT OFFICE.

KARL FEILNER, OF NUREMBERG, GERMANY.

STARTING DEVICE FOR MULTICYLINDER INTERNAL-COMBUSTION ENGINES.

1,127,218.

Specification of Letters Patent.

Patented Feb. 2, 1915.

Application filed April 25, 1913. Serial No. 763,518.

*To all whom it may concern:*

Be it known that I, KARL FEILNER, a subject of the German Emperor, and a resident of Nuremberg, Bavaria, Germany, have invented certain new and useful Improvements in and Relating to Starting Devices for Multicylinder Internal-Combustion Engines, of which the following is a specification.

This invention relates to improvements in starting mechanisms for internal combustion engines, in which compressed air is used.

Figures 1 and 2 are cross sections of my device taken at right angles to each other.

Starting mechanisms are already known in which the starting valve is provided with a controlling piston to which compressed air is supplied by means of separate distributing valves, (one each for starting, forward, and backward running). The air control valves in question are moved only during the starting by means of suitably shaped cams on a control shaft. During this time they are in fact forced by compressed air against the cams, but at other times, that is to say during the normal running of the engine, they are lifted off the cams and are consequently stationary. The air control valves thus have a double function: they must allow the compressed air to pass to the controlling piston of the starting valve, that is to say, alternately allow compressed air into the pipe leading to them and then allow this to exhaust from the pipe. On account of this double function which these valves must perform, slide valves or cocks have usually been selected for shutting off the compressed air, as they are comparatively simple and have few constructional parts. These air control valves, however, form a very sensitive portion of the complicated compressed air starting apparatus, and they may easily cause stoppages of the entire apparatus. These control slide valves, in spite of being most carefully made, are in fact very difficult to keep tight against the high pressure of the starting air, and further the slide valves become corroded or during long periods of regular working of the engine, during which they are inoperative, often become fixed by the combined action of dirt or dried oil and then fail to act when it is desired to start or reverse the engine. According to this invention, however, valves with conical seatings, such as puppet valves, are employed in order to thereby exclude the possibility of breakdown.

The present invention is more particularly described with reference to the form of construction illustrated in the accompanying drawings.

The starting valve $a$ of known type is connected to a controlled piston $b$, on which the compressed air first acts and is afterward duly exhausted. Three valves $c$, $d$ and $f$ are provided for controlling the compressed air passing to the starting valve. Of these valves, $c$ and $f$ serve both for admitting the compressed air and also to allow it to exhaust from the pipe which extends from the controlling valves to the starting valve $a$, while the valve $d$ is exclusively used for exhausting this pipe. The valve $c$ serves for starting in the forward direction, the valve $f$ for starting in the reverse direction. A pipe 2 serves for conveying the compressed air for starting in the forward direction of running, and the pipe 3 for starting in the reverse direction of running. Both pipes 2 and 3 lead from the compressed air reservoir. On each of these two pipes two valves $g^2$ $h^2$ and $g^3$ $h^3$ are inserted respectively. The valves $h^2$ and $h^3$ are closed by the pressure of the starting air during the normal running of the engine, while the valves $g^2$ and $g^3$ are opened in order to exhaust the control mechanism. If the engine is to be started the respective exhaust valve $g^2$ or $g^3$ is closed and the respective admission valve $h^2$ or $h^3$ opened, so that compressed air can pass to the controlling valve $c$ or $f$ respectively. It is not necessary to provide a set of valves $g^2$, $g^3$, $h^2$ and $h^3$ for each cylinder; it suffices to provide a double pair of these valves for the whole of the working cylinders of an engine, namely, one pair for starting in the forward direction and one pair for starting in the reverse direction.

The controlling valves $c$, $d$, $f$, are operated by three cams $i$, $k$, $l$, respectively, which are keyed on the cam shaft $m$. The cams act indirectly on the spindles of the valves $c$, $d$, $f$, through levers $n$. By this means no lateral pressure is exerted on the valve spindles by the cams. The levers $n$ are pivotally mounted on pins $q$. They are provided with abutments $o$ in contact with the valve spindles $c$, $d$, $f$, and with rollers $p$ in contact with the cams.

During the normal running of the engine the levers $n$ are lifted by means of eccentrics $r$ away from the cams $i$, $k$, $l$, to open the controlling valves $c$, $d$, $f$.

If the engine is, for example, to be started in the forward direction, the levers $n$ are first brought by means of the eccentrics $r$ into the position illustrated in Fig. 2, so that the rollers $p$ rest on the cams and the valves $c$, $d$, $f$, tend to close and lie in positions depending on the position of their respective cams. The exhaust valve $g^2$ is then closed and the valve $h^2$ opened, so that compressed air can reach the valve $c$. Now this apparatus is intended for multicylinder engines, and therefore a separate starting mechanism of the kind described above is necessary for each working cylinder. The various starting mechanisms are adjusted in such a way that the cam of at least one cylinder keeps the respective controlling valve $c$ open. Consequently in this particular cylinder compressed air passes through the opened valve $c$ and the pipe 1 to the piston $b$ of the starting valve $a$ and opens the latter, so that compressed air can pass directly through the pipe 4 into that cylinder and set the engine going. The cam shaft $m$ will be thereby turned. As soon as the cam $i$ is turned to allow the valve $c$ to again close, the cam $k$ will open the valve $d$ and this then allows the compressed air in the pipe 1 to escape through the hole $t$. When the cam $k$ releases the valve $d$ and this has consequently closed, the cam $l$ opens the valve $f$ which then allows the compressed air in the pipe 1 to continue to escape, through the pipe 3 and the valve $g^3$, which then happens to be open. The valve $f$ remains open until the cam $i$ commences to open the starting valve $c$ for the forward direction, whereupon the cycle of operations recommences. It is thus evident that the pipe 1 is open to the exhaust during the entire period in which the valve $a$ is shut. In starting in the reverse direction the operations are exactly as above described for starting in the forward direction, only in this case instead of the exhaust valve $g^2$ the exhaust valve $g^3$ is closed and instead of the compressed air admission valve $h^2$ a similar valve $h^3$ is opened and consequently the controlling valve $f$ acts as admission valve for the compressed air and the cam $l$ controls the admission of air to the piston $b$, while the controlling valve $c$ acts as exhaust valve. The valves $c$ and $f$ and the cams $i$ and $l$ thus exchange functions.

From the action of the apparatus it is evident that the valves $c$ and $f$ must be provided with strong closing springs $u$ and $v$ respectively, because in starting they must remain closed against the pressure of the compressed air which bears on their under side. On the other hand a weaker closing spring suffices for the valve $d$, because this valve is forced by the pressure of the compressed air acting on its upper side down on to its seat.

The members which must be moved in starting, and reversing, that is to say the valves $g^2$, $g^3$, $h^2$ and $h^3$ and the eccentric $r$ may be operated in any known manner by a common member such as a lever, ratchet wheel or the like with which the valves $g^2$, $g^3$, $h^2$ and $h^3$, and the eccentric $r$ are connected by suitable rod connections in such a way that they are operated in the correct succession.

Instead of rod connections the transmission of movement, may be effected in an already known manner by means of a compressed fluid or gaseous medium.

Having now particularly described and ascertained the nature of my said invention and in what manner the same is to be performed, I declare that what I claim is:—

1. A starting and reversing device for multi-cylinder internal combustion engines comprising three valves for each cylinder for controlling the compressed air actuating the starting valve, a compressed air pipe leading to the starting valve, one of said valves serving exclusively for exhausting the compressed air pipe, the two others serving alternately according to the starting direction, either for admitting or exhausting the compressed air in said air pipe leading to the starting valve.

2. A starting and reversing device for multicylinder internal combustion engines comprising three valves having conical seatings for each cylinder for controlling the compressed air actuating the starting valve, a compressed air pipe leading to the starting valve, one of said valves serving exclusively for exhausting the compressed air pipe, the two others serving alternately according to the starting direction, either for admitting or exhausting the compressed air in said air pipe leading to the starting valve.

Signed at Nuremberg, Germany, this 9th day of April 1913.

KARL FEILNER.

Witnesses:
 OSCAR BOCK,
 SIGMUND RODER.